Figure 1:
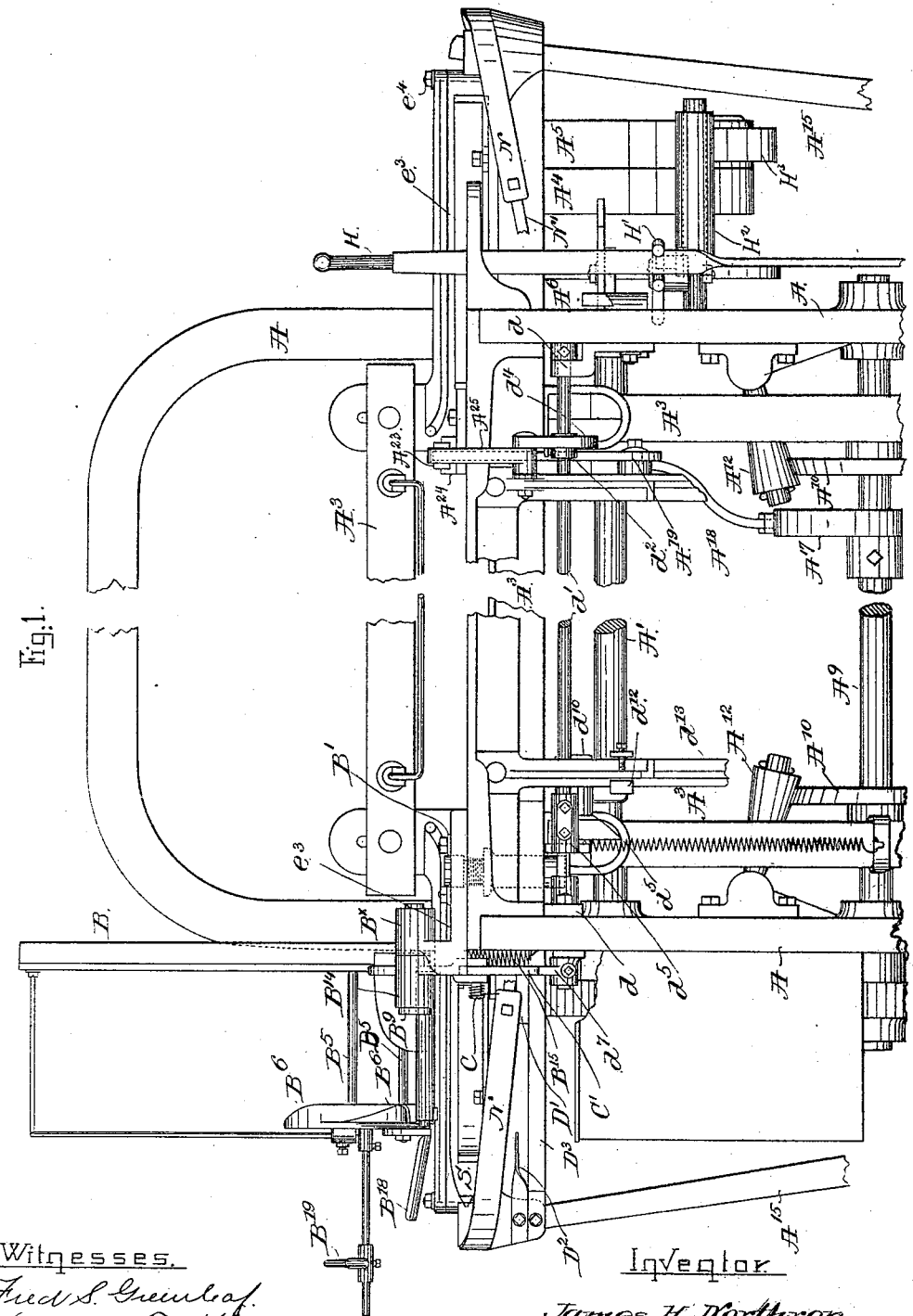

(No Model.)  9 Sheets—Sheet 1.

J. H. NORTHROP.
LOOM.

No. 454,810.  Patented June 23, 1891.

Witnesses.
Fred S. Greenleaf.
Edward F. Allen

Inventor
James H. Northrop
by Crosby & Gregory
attys.

(No Model.) 9 Sheets—Sheet 2.
J. H. NORTHROP.
LOOM.
No. 454,810. Patented June 23, 1891.
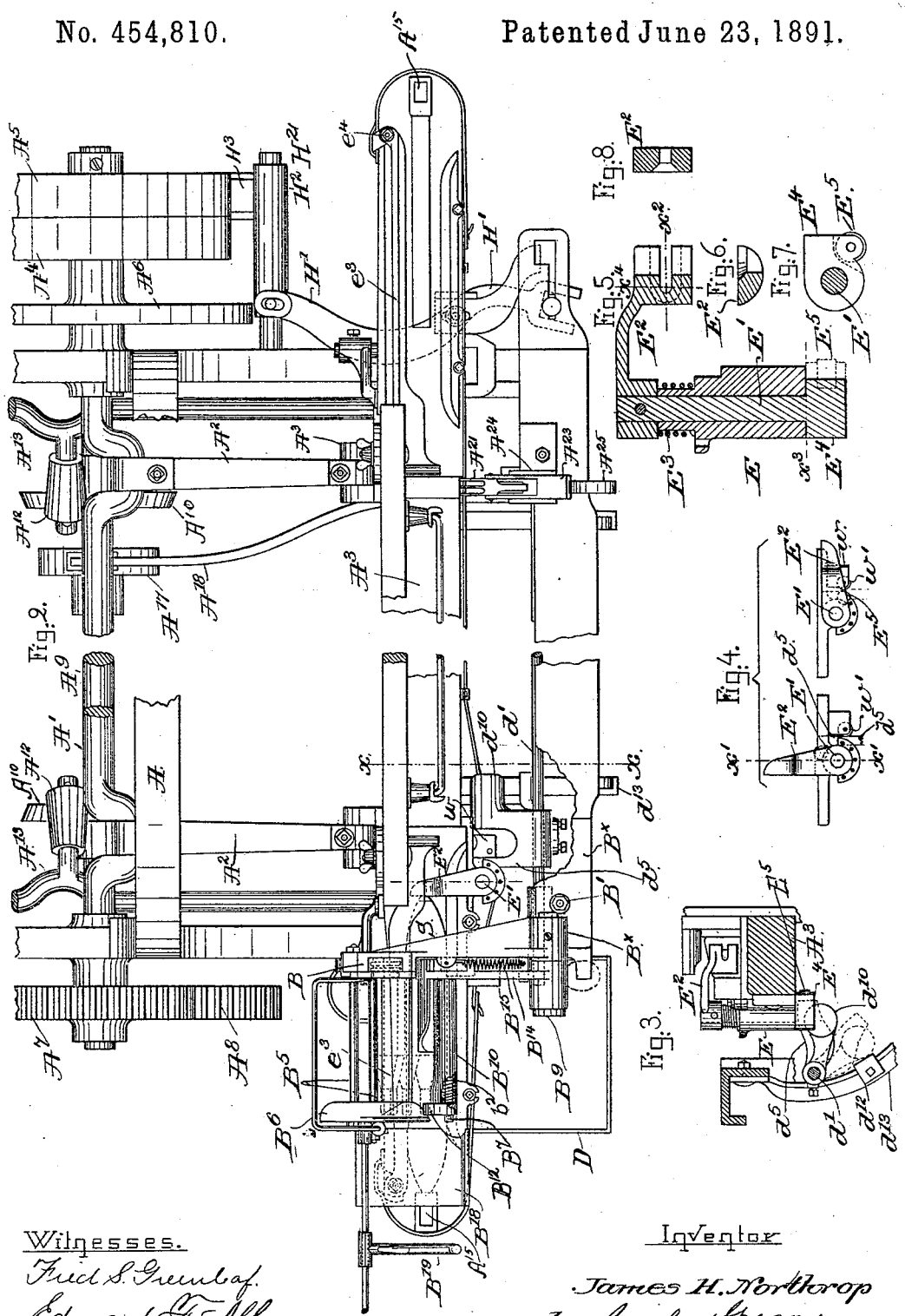
Witnesses.
Fred S. Greenleaf.
Edward T. Allen
Inventor
James H. Northrop
by Crosby & Gregory
Attys.

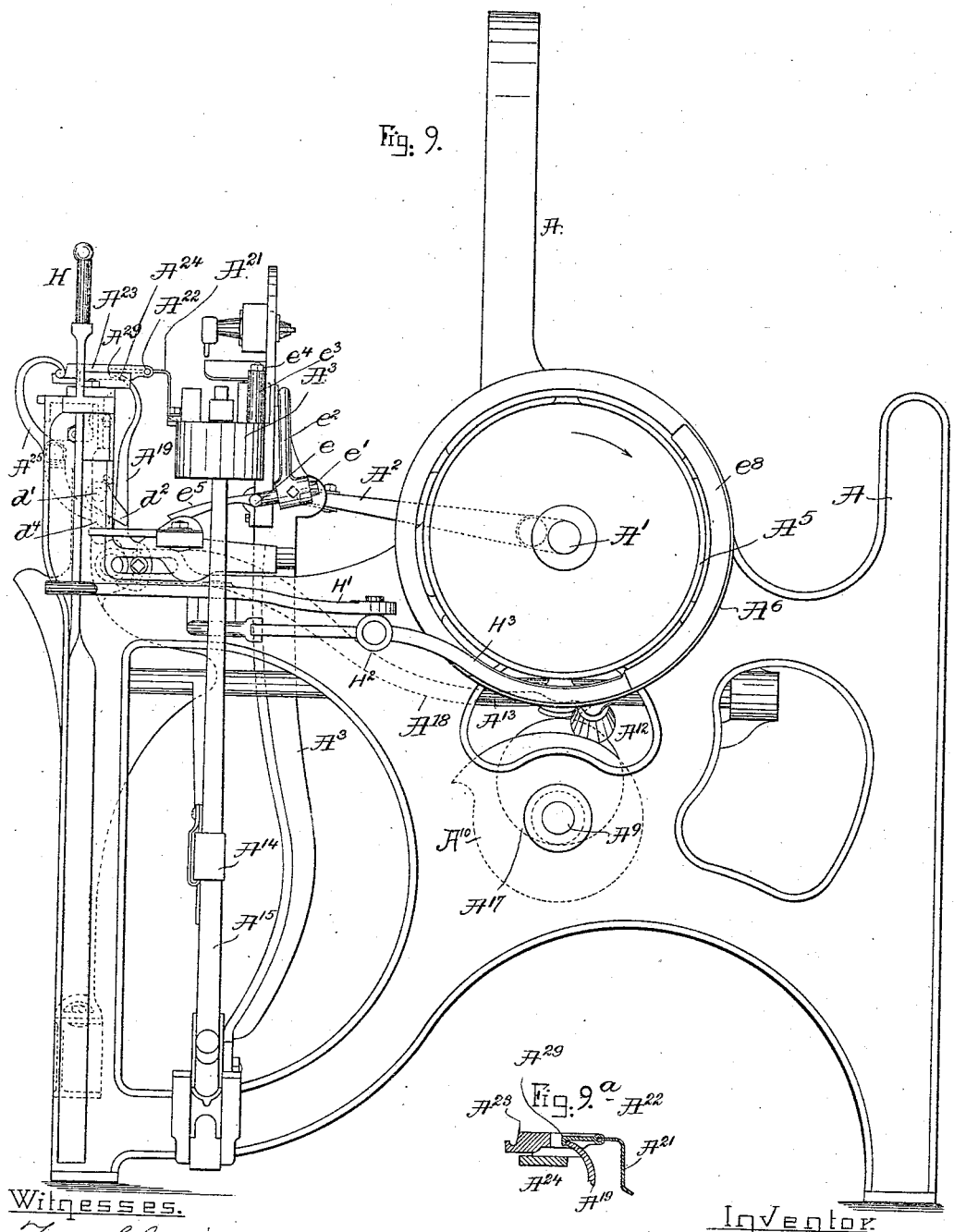

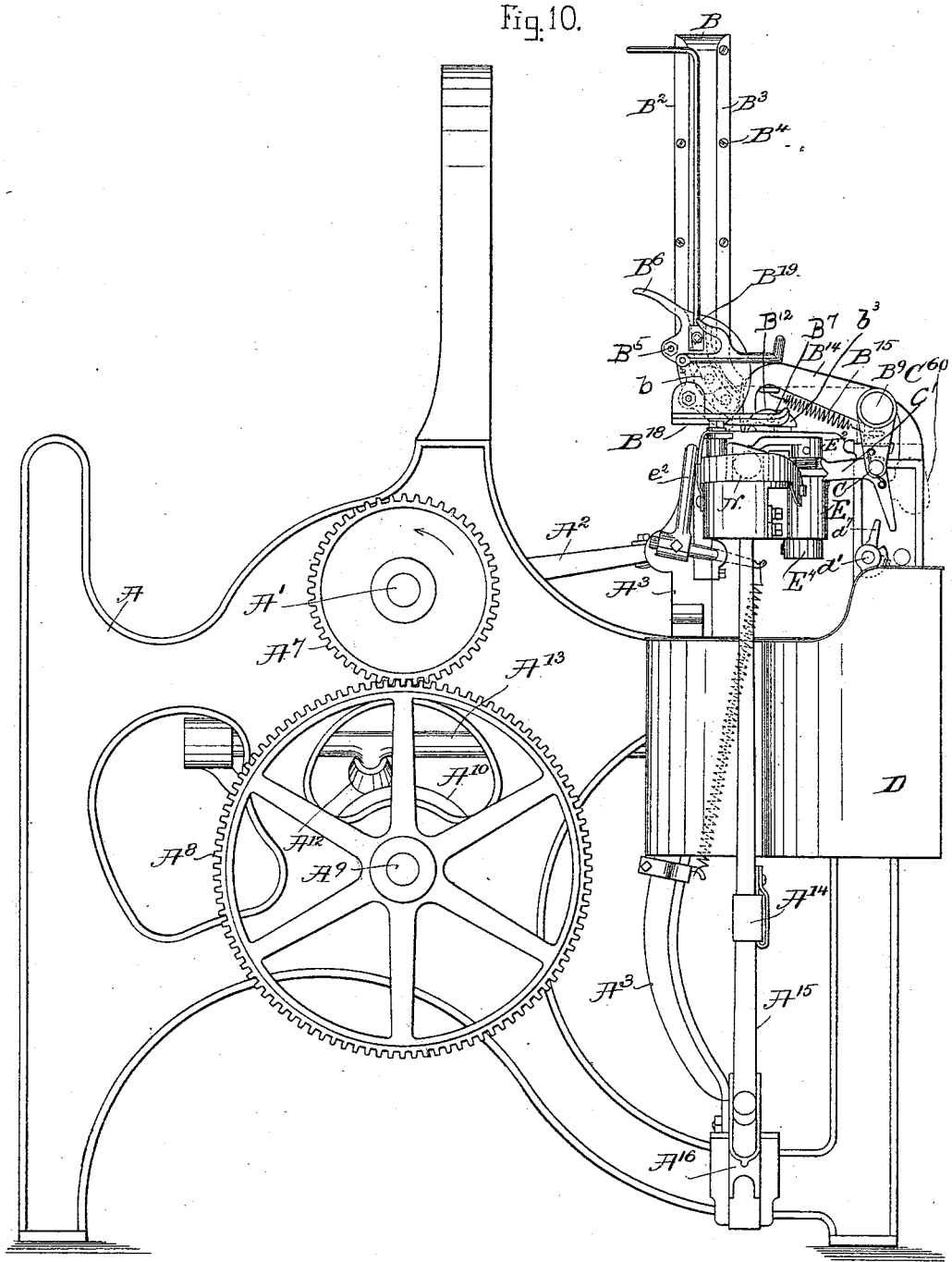

(No Model.) 9 Sheets—Sheet 5.
J. H. NORTHROP.
LOOM.
No. 454,810. Patented June 23, 1891.
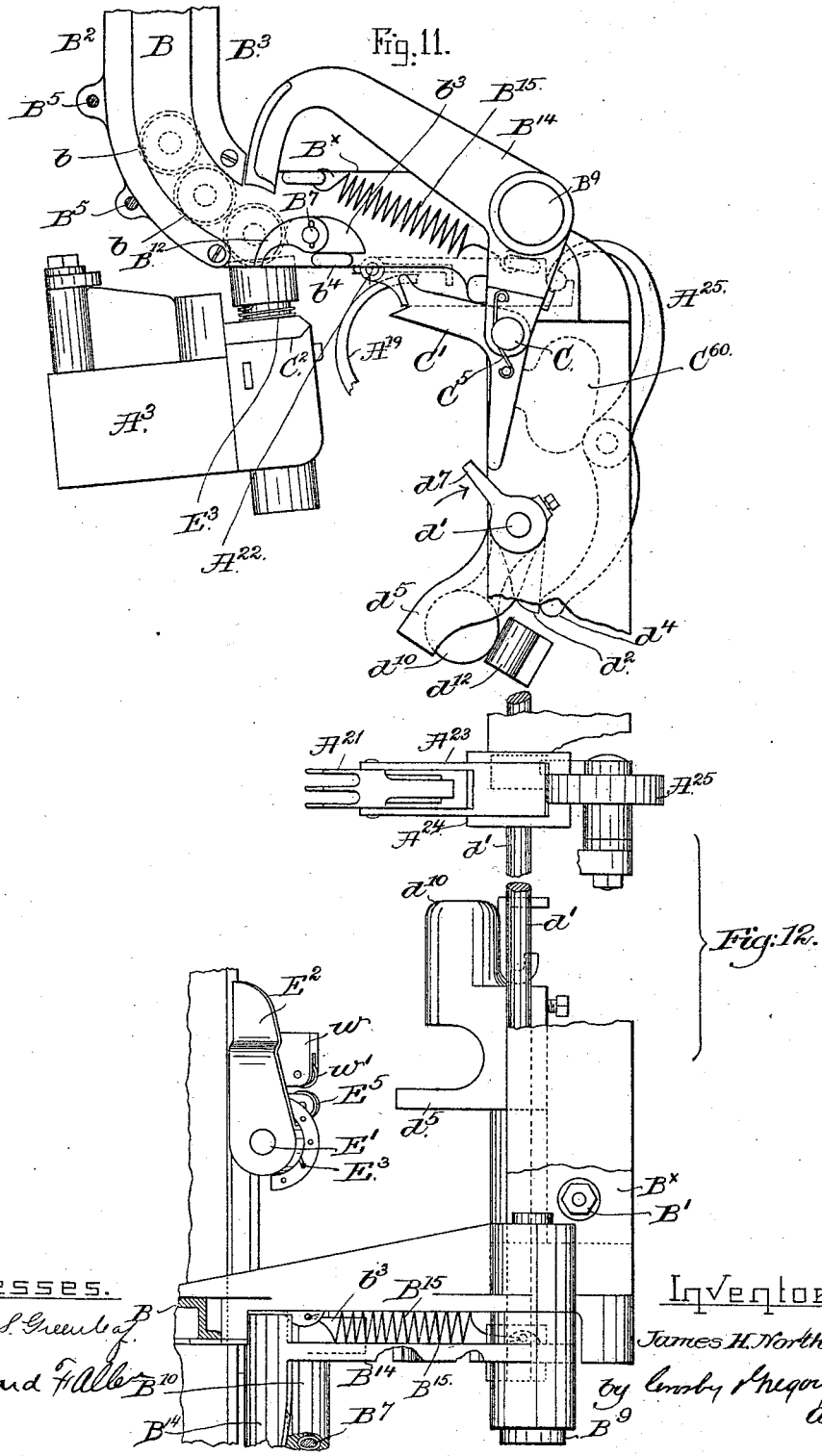
Witnesses.
Fred S. Greenleaf
Edward F. Allen
Inventor.
James H. Northrop
by Crosby & Gregory
attys.

(No Model.)  9 Sheets—Sheet 6.

J. H. NORTHROP.
LOOM.

No. 454,810.  Patented June 23, 1891.

Witnesses.  Inventor.
Fred S. Greenleaf.  James H. Northrop
Edward F. Allen  by Crosby & Gregory
  attys

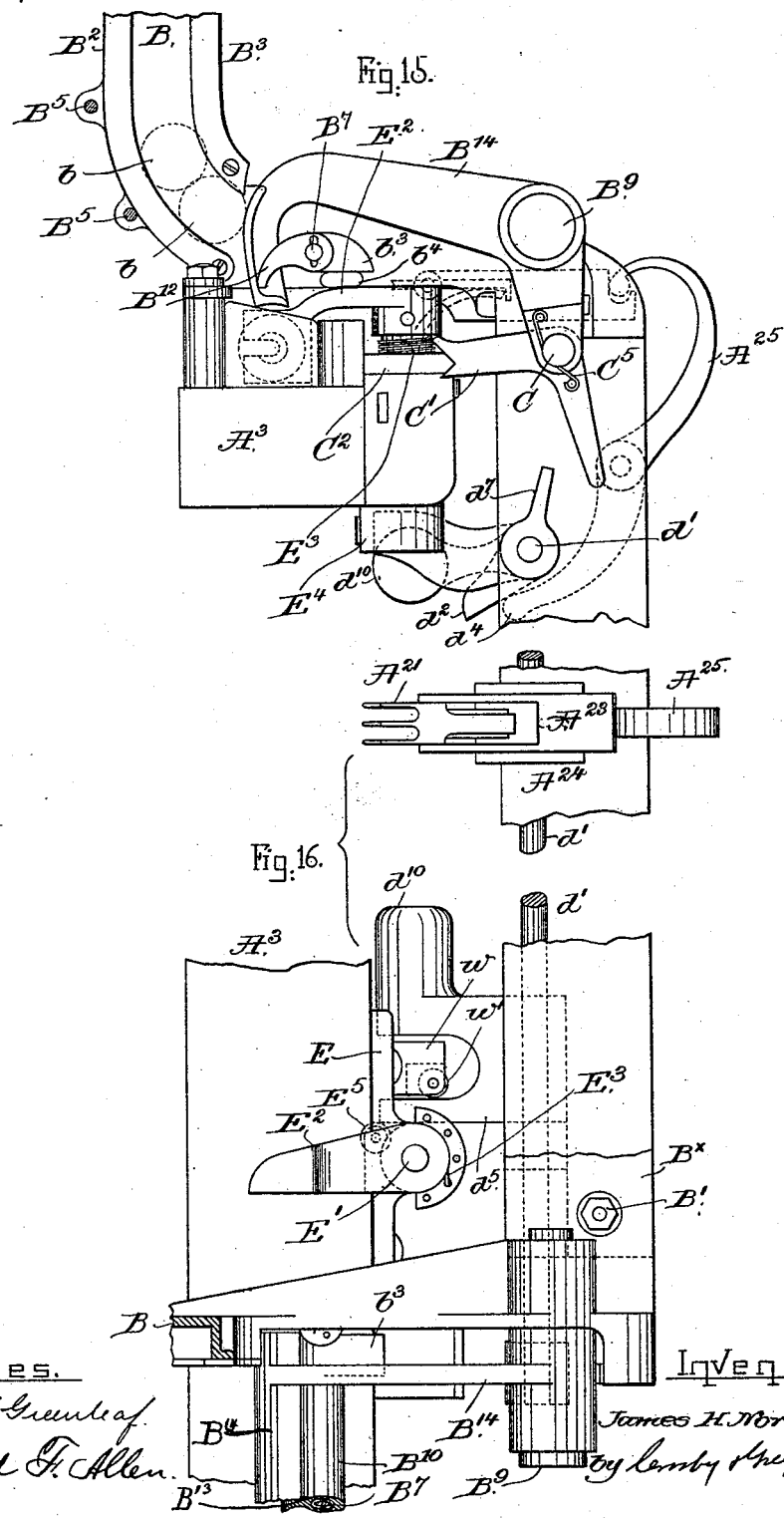

(No Model.)  
J. H. NORTHROP.  
LOOM.
9 Sheets—Sheet 8.
No. 454,810. Patented June 23, 1891.
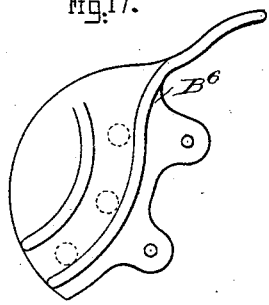
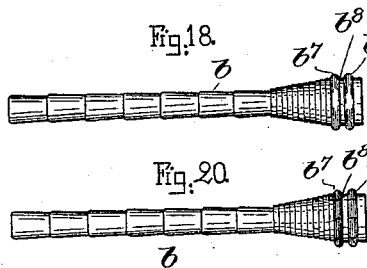
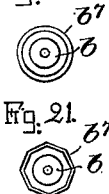
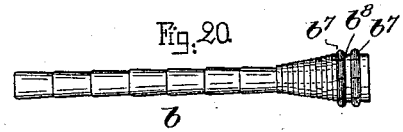
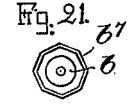
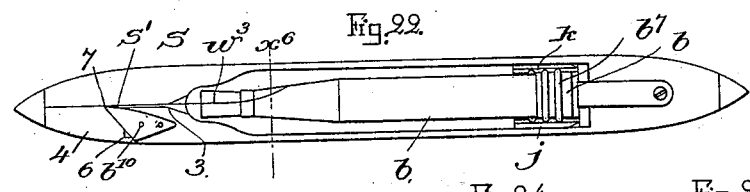
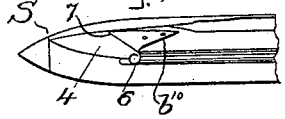
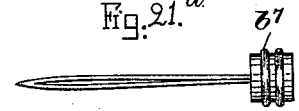
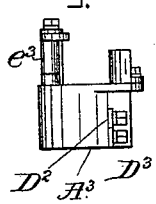
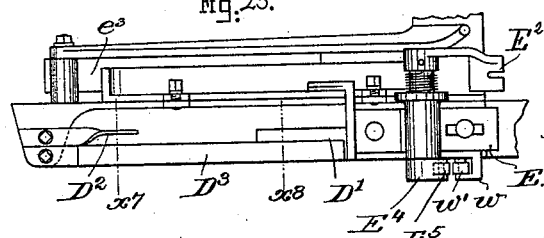
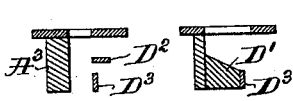
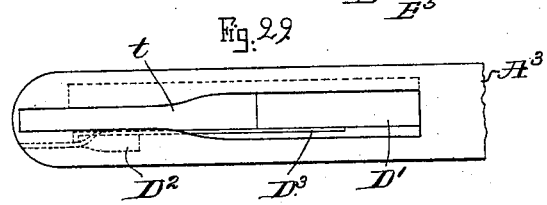
Witnesses.  
Fred S. Greenleaf.  
Edward F. Allen.
Inventor  
James H. Northrop  
by Crosby & Gregory  
attys (No Model.)  9 Sheets—Sheet 9.
J. H. NORTHROP.
LOOM.
No. 454,810. Patented June 23, 1891.
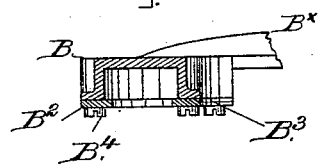
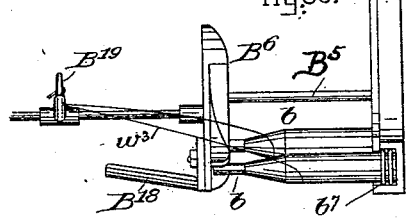
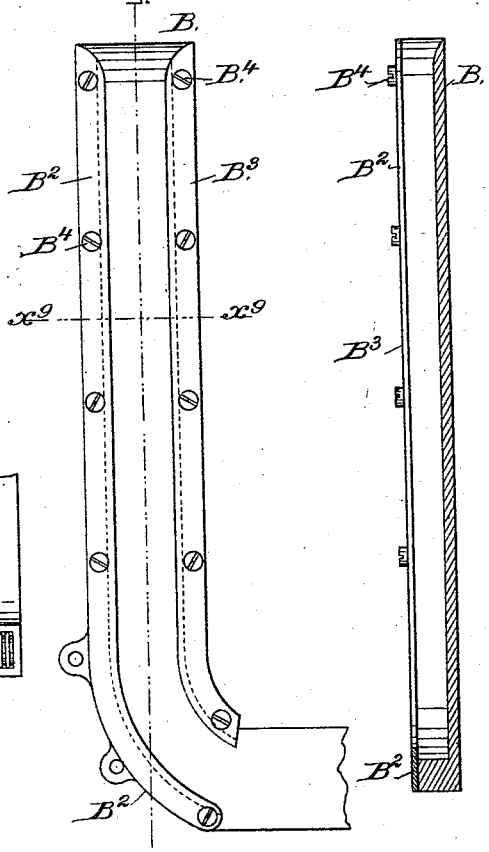
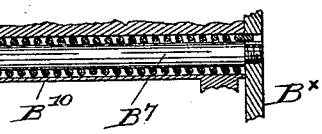
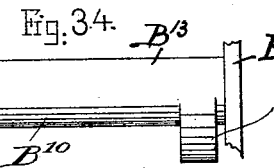
Witnesses.
Fred S. Greenleaf.
Edward F. Allen.
Inventor
James H. Northrop
by Crosby & Gregory attys.

UNITED STATES PATENT OFFICE.

JAMES H. NORTHROP, OF HOPEDALE, MASSACHUSETTS, ASSIGNOR TO GEORGE DRAPER & SONS, OF SAME PLACE.

LOOM.

SPECIFICATION forming part of Letters Patent No. 454,810, dated June 23, 1891.

Application filed February 6, 1891. Serial No. 380,494. (No model.)

*To all whom it may concern:*

Be it known that I, JAMES H. NORTHROP, a subject of the Queen of Great Britain, and residing at Hopedale, county of Worcester, State of Massachusetts, have invented an Improvement in Looms, of which the following description, in connection with the accompanying drawings, is a specification, like letters and figures on the drawings representing like parts.

This invention has for its object the production of apparatus to be incorporated with or added to a loom, whereby when the filling breaks or becomes exhausted from the shuttle other filling will be automatically supplied thereto without any intermission or stopping of the loom, the construction of the parts being such that the introduction of the filling may be effected even while the loom is running at high speed.

In the best form in which I have practically embodied my invention a bobbin, a spindle, or other device carrying the filling is automatically inserted into a shuttle while in the shuttle-box of the loom, the shuttle being one from which the filling has previously been exhausted or which has been rendered inoperative by the filling breaking.

Prior to my invention I am not aware that any one has ever in any way automatically placed filling in a shuttle in a shuttle-box of a loom and threaded the shuttle automatically, and therefore the invention herein contained is intended to be broad and generic as to the means called into play to accomplish the purpose set forth.

This present invention is intended as subordinating other inventions in looms made by me and described in application Serial No. 351,228, which latter application shows a species of the invention herein contained. As herein provided for, the bobbin or spindle, which may be of any construction and which carries the filling, is taken from a hopper or guide suitably shaped to receive one, or, it may be, a series of bobbins or spindles, the said bobbins or spindles being pushed one by one by a pusher directly from the hopper into the shuttle in the shuttle-box. The shuttle is open at two sides, preferably its upper and under sides, and is provided with a suitable holder or holding devices adapted to receive the head of the bobbin or spindle containing the filling and to hold the said bobbin or spindle in substantially horizontal position in the shuttle while the filling is being drawn or woven off; but when the filling is broken or exhausted the said bobbin or spindle is ejected from that open side of the shuttle opposite that through which it entered the shuttle, the bobbin or spindle passing out through a slot in the shuttle-box of the lay. The shuttle referred to is slotted in such manner that the thread or yarn upon the bobbin or spindle after it is inserted in the shuttle will be automatically threaded into the delivery eye or device of the shuttle.

Prior to my invention I am not aware that a shuttle open at two sides for the entrance of a bobbin or spindle into it at one side and its discharge from the other side has ever been provided with a holder for the reception and retention of a bobbin or spindle; nor has such a shuttle, or, in fact, any shuttle, ever been automatically threaded in a shuttle-box; and therefore these features singly and co-operatively are to be herein claimed broadly.

When a bobbin or spindle is to be automatically inserted into a shuttle in a shuttle-box, the shuttle must occupy approximately a predetermined position in the box, so that the pusher may push or introduce the bobbin or spindle into the open side of the shuttle and into the holder, and to effect this with certainty I have in this embodiment of my invention combined with the pusher, which acts to push the bobbin or spindle into the shuttle, a shuttle-positioning device which acts on the inner end of the shuttle and puts the same into the proper position in the shuttle-box to receive a bobbin or spindle, the said positioning device effectually preventing any improper position of the shuttle due to rebounding in the shuttle-box after striking the picker. The shuttle-positioning device herein employed is under the control of the weft-feeler, so that it is actuated to strike against the shuttle-tip only when the shuttle is about to be supplied with weft, and with the said positioning device I have combined a finger which holds it locked in place against the tip of the shuttle during that part of the beat of the lay in which the filling is supplied to the shuttle. I have so constructed and timed the operative parts that the bobbin or spindle is supplied to the shuttle during the forward movement of the lay toward the breast-beam and at a time when the lay is traveling at about its slowest speed, it being understood that the lay in its forward movement starts quickly and travels more slowly to the end of its forward stroke, and that the lay upon its backward stroke starts slowly and gradually moves more rapidly toward its back-stroke. The head of a bobbin being cylindrical in form, it becomes possible to transfer a bobbin from a stationary hopper into a shuttle carried by the swinging lay while the lay is in motion underneath the hopper, as it under pressure may roll into place owing to its circular form. The bobbin might be many-sided instead of cylindrical, and yet act in the same way, although a circular shape lessens the possibilities of catching or being impeded in its movement. I therefore deem as equivalent to a cylindrical head any many-sided form which will roll into the shuttle. For the best results the hopper from which the bobbins are taken will be of peculiar shape—that is, it will have at one side a slotted channel or guideway adapted to receive within it and embrace the heads of the bobbins or spindles. The outer ends of the bobbins or spindles will preferably rest on a narrow lip or flange which aids in supporting the bobbins in proper position.

As herein provided for, both the shuttle-positioning device and the pusher are operated by fingers mounted upon or connected with a rock-shaft supported at or near the breast-beam of the loom, the said rock-shaft being moved by the filling-fork or weft-feeler slide and a suitable intermediate arm or finger whenever the filling or weft-thread breaks or runs out, said movement taking place during a movement of said slide consequent upon the breaking or running out of the thread.

In looms for weaving the coarse or plainest goods the cost for weaving is usually about one-half the cost of the whole labor in manufacturing cloth, and this proportion of cost is increased on the better qualities or styles of cloth.

The work of changing filling requires at least one-half of a weaver's time, and it is a low estimate that the possibility of automatically controlling the supply of filling without stopping the loom will cheapen the cost of weaving one-third.

It is also of importance to manufacturers that any loom employed shall produce its maximum amount of work, and hence the saving of time usually lost in changing shuttles or keeping up the supply of weft is of great moment.

The loom herein shown and to which my invention is represented as applied is one of well-known make; but it will be understood that my invention may be applied to any other form of loom to equal effect, and in each form of loom the shape of some of the parts will have to be varied to conform to the particular loom or to the particular part of the loom from which it is desired to take motion for actuating the parts essential to my invention, so this invention is not to be limited to the particular means shown for actuating the pusher at the proper time, as such means may vary very considerably in different looms.

In the form in which my invention is herein embodied I have timed the movement of the pusher from the weft-feeler, employing for such purpose one form of connecting devices.

Figure 13:
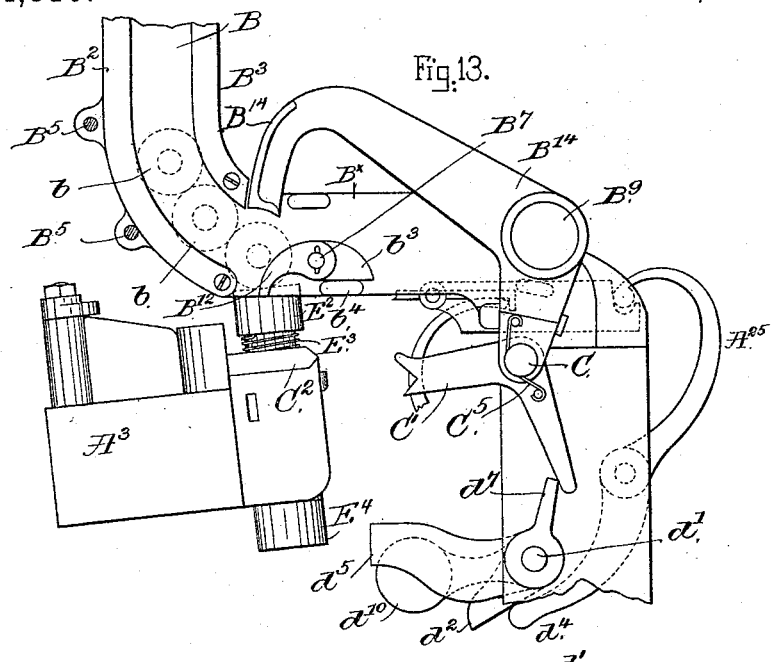
Figure 14:
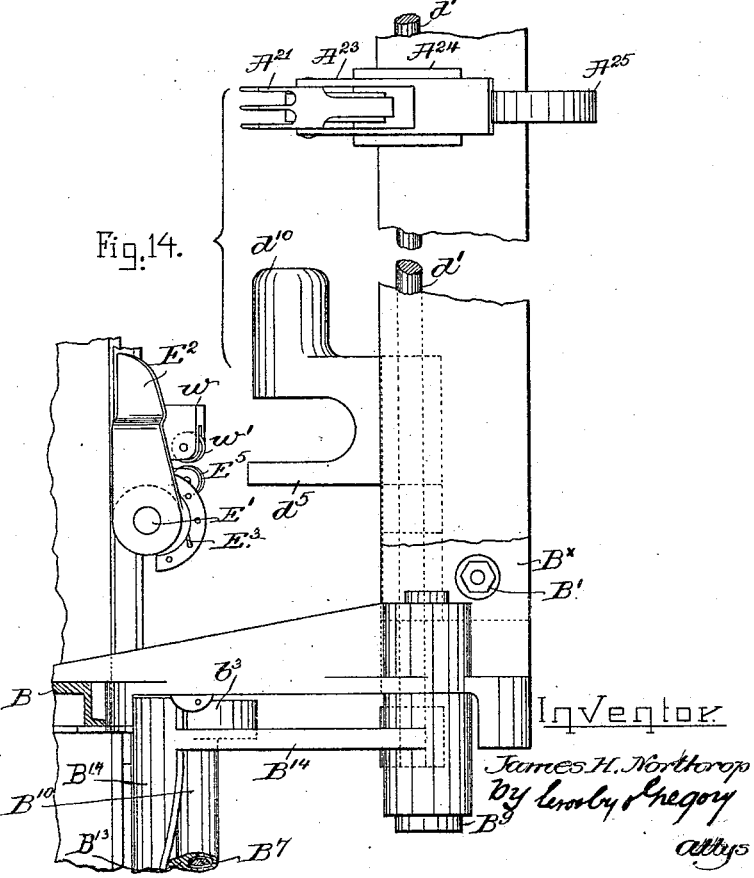

Figure 1 is a partial front elevation of a loom containing my improvements, the devices for inserting the filling into the shuttle in the shuttle-box being represented as located at the left-hand end of the loom, the loom-frame and other parts being broken away in places to save space upon the drawings. Fig. 2 is a plan view of part of the loom shown in Fig. 1. Fig. 3 is a sectional detail in the line $x$, Fig. 2, looking to the left, the shuttle-positioning device being represented in elevation. Fig. 4 represents two details of the shuttle-positioning device in different positions. Fig. 5 is an enlarged section on the line $x'$, Fig. 4. Figs. 6, 7, and 8 represent sectional details of the shuttle-positioning device, the sections being taken in lines $x^2$, $x^3$, and $x^4$, Fig. 5. Fig. 9 is a right-hand end elevation of the loom shown in Fig. 1; Fig. 9$^a$, a detail showing the weft-fork and slide in longitudinal section; Fig. 10, a left-hand end elevation of the loom. Fig. 11 is an enlarged detail of the pusher and hopper or guide, together with a part of the breast-beam, the pusher being shown in its normal elevated position, the lay being substantially in its backward position. Fig. 12 is a top or plan view of the devices shown in Fig. 11. Fig. 13 is a view similar to Fig. 11, but with the tripping device put into position by the filling stop-motion preparatory to the advance of the lay, during which advance the pusher is to be moved to push filling into the shuttle. Fig. 14 is a top or plan view of the parts shown in Fig. 13. Fig. 15 is yet another view of the parts shown in Fig. 11, but in a different position, the pusher having acted to push filling into the shuttle; Fig. 16, a top or plan view of the parts shown in Fig. 15. Fig. 17 is a detail showing the inner side of the plate which supports the outer end or blade of the bobbin or spindle used. Fig. 18 represents a bobbin of one of the forms which I prefer to use; Fig. 19, an end view thereof. Figs. 20 and 21 show a modified form of bobbin. Fig. 21$^a$ shows a different form of filling-carrier. Fig. 22 is a top view of one form of self-threading shuttle containing a bobbin; Fig. 23, a partial front side elevation of the said shuttle to show part of the self-threading delivery-eye; Fig. 24, a section in the line $x^6$, Fig. 22, to show part of the self-threading eye. Fig. 25 is a detail showing the front of that end of the lay having a shuttle-box in which the shuttle is contained when the filling is being changed therein. Fig. 26 is a left-hand end view of the lay and shuttle-box shown in Fig. 25; Fig. 27, a sectional detail in the line $x^7$, Fig. 25; Fig. 28, a sectional detail in the line $x^8$, Fig. 25. Fig. 29 is a plan view of the shuttle-box shown in Fig. 25. Figs. 30 and 31, enlarged, show the main part of the hopper or guide in face view and longitudinal section. Fig. 32 is a cross-section of the hopper in the line $x^9$, Fig. 30. Fig. 33 is a detail of the stop at the lower end of the hopper or guide, the hollow sleeve-like part of the stop being broken out to show its actuating-spring and the stud supporting it. Fig. 34 is a top or plan view of the stop referred to, and front edge view; Fig. 35, a view of the same looking from the right in Fig. 34; and Fig. 36 is a detail showing the lower end of the hopper, together with the plate $B^6$, the plate $B^{18}$, and the holder $B^{19}$, and two bobbins having their threads tied to the holder.

Referring to the drawings, A represents the loom-frame; $A'$, the crank-shaft; $A^2$, the lay connecting-rods; $A^3$, the lay; $A^4$, the fast pulley on the crank-shaft; $A^5$, the loose pulley at the side of it; $A^6$, the brake-wheel; $A^7$, a toothed gear on the crank-shaft, and $A^8$ a toothed gear on the lower or picker-shaft $A^9$. The shaft $A^9$ has picking-cams $A^{10}$, which act upon rollers $A^{12}$, mounted upon arms of the picking-shafts $A^{13}$, the latter having usual arms connected in usual manner by straps $A^{14}$ to the usual picker-sticks $A^{15}$, mounted, preferably, in suitable rockers, as $A^{16}$. The shaft $A^9$ has a cam $A^{17}$, which acts upon a lever $A^{18}$, having at its upper end the usual hammer $A^{19}$, which acts upon the downturned end $A^{29}$ (see Fig. 9$^a$) of the weft fork or feeler $A^{21}$, represented as pivoted at $A^{22}$ upon the weft-fork slide $A^{23}$, mounted in a suitable stand $A^{24}$, screwed to the top of the breast-beam. The rear end of the slide $A^{23}$, carrying the weft fork or feeler, is shaped to receive the downturned upper end of a lever $A^{25}$. The outward movement of the picker carried by the picker-staff is checked by a strap N, attached in usual manner to the rear side of the lay and carried around the end of the slot in the lay in which the picker-stick works, the free ends of the straps at opposite ends of the lay being united in usual manner by a cross-strap $N'$ but partially shown. Each shuttle-box has a pivoted binder $e^3$, which is acted upon by a binder-finger $e^2$, secured to a rearwardly-extended finger $e'$ of a stop-motion or binder-shaft $e$, having suitable bearings in the swords of the lay just below the lay-beam, the said shaft $e$ having an outwardly-extended finger or dagger $e^5$, which, when a shuttle fails to be properly boxed, drops, and through usual devices effects the release of the shipper-handle H from its usual holding-notch in the plate at the end of the lay, causing the said shipper-handle to actuate a shipper-lever $H'$, connected with a hub $H^2$, mounted to slide upon a pin or stud $H^{21}$, and through a belt-controlling fork $H^3$ to move the usual driving-belt (not shown) from the fast to the loose pulley in usual manner.

The devices so far referred to by letter are and may be common to other well-known looms for weaving plain or common cloth, and in practice a loom containing the invention to be herein described will and may have any usual or suitable take-up and let-off mechanism and any usual harness or shed-forming mechanism; but as such devices are old and common I have not deemed it necessary to herein illustrate the same or to broadly describe them more than to say that the picker-sticks will act on the shuttle to throw it across the raceway from one to the other shuttle-box and through the shed, all as usual in weaving.

I will now describe my improvements which have been added to this well-known form of loom, but which are equally applicable to other looms. The breast-beam near the left-hand side of the loom, as herein represented, has erected upon it a hopper or guide B, the shape of which is best shown in Figs. 1 and 10 and 30 to 32. The hopper or guide proper is represented as provided at its lower end with a stand $B^\times$, which is connected to the breast-beam by a suitable bolt $B'$. The acting part of this hopper or guide is shaped, as shown best in Fig. 32, to form a raceway for the reception of and to guide and direct the heads of the bobbins or spindles $b$ containing the filling, which bobbins or spindles are to be automatically pushed into a shuttle, the said bobbins or spindles impelled by gravity rolling or sliding down to the lower end of the hopper or guide, as in Figs. 11 and 13, the endmost bobbin or spindle being stopped in position below the pusher $B^{14}$, to be described, the pusher acting from time to time upon failure of the weft or filling to push the endmost bobbin or spindle directly into the shuttle in the shuttle-box then below it and discharging the spent bobbin or spindle from the shuttle, as will be described. The hopper or guide, as represented, has two plates $B^2$ $B^3$ applied to it by suitable screws $B^4$, and the lower end of the plate $B^2$ is shaped so as to support the head ends of the series of bobbins therein. The hopper or guide, as best shown in Fig. 2, has two rods $B^5$ extended therefrom laterally, to the ends of which is fastened a guide-plate $B^6$, (shown separately in Fig. 17,) said plate having suitable lips or projections to support the tip of the blade of the bobbin or spindle of whatever form employed to carry the filling or weft. The stand $B^\times$ referred to has a stud $B^7$, (see Figs. 11 and 33,) upon which is mounted loosely a bobbin stop or rest $B^{10}$, composed, as represented, of a sleeve having at its rear side a projection $B^{12}$, the said rear side being shaped to receive against it the side of the endmost bobbin in the hopper or guide, while the tip of the bobbin or spindle rests on the projection $B^{12}$, the stop or rest being normally retained in the position shown in Fig. 11 by means of a suitable spring, (represented as a spiral spring $b^2$, see Fig. 33,) the extent of movement of the said stop, under the action of the said spring, being limited by a projection $b^3$, forming part of the stop which meets an ear $b^4$, connected to or forming, preferably, a part of the stand $B^\times$. The stop $B^{10}$ is mounted upon a stud $B^7$, extended from the stand $B^\times$, the spring referred to being shown in Fig. 33 as interposed between the said stud and the hollow sleeve of the stop. The stand $B^\times$ also contains a stud $B^9$, upon which is mounted to oscillate the hub of the pusher $B^{14}$, the shape of which is best shown in Figs. 11, 13, and 15, the pusher being normally held in the position Fig. 11 by a suitable spring $B^{15}$, the said spring being shown in Figs. 2, 10, and 11, one end of the spring (shown as of spiral form) being connected with a lug of the pusher, the other end being connected to a suitable stud or staple forming part of the stand $B^\times$. A depending-arm of the pusher has pivoted upon it at C a tripping device C', herein shown as an elbow-shaped lever, notched at its upper end and adapted to be engaged when the tripping device is in certain positions by a lip or projection $C^2$, attached to or carried by the lay and projecting from the front side thereof. The tripping device is not engaged by the lip or projection except during that forward beat of the lay when the shuttle is to be supplied with filling. Normally the trip C' is acted upon by one end of a spiral spring $C^5$, which surrounds the pivot C, the other end of the spring being connected to a suitable stud on an arm of the pusher, so that the spring normally keeps the tripping device in the position shown in Fig. 11. Instead, however, of this spring I may employ a weight $C^{60}$, as shown by dotted lines in Figs. 10 and 11, attached to or forming part of the trip.

The plate $B^6$ has attached to it in suitable manner a plate $B^{18}$, which serves to support the filling or weft thread between the bobbins or spindles $b$ in the hopper or guide and a holder or stud $B^{19}$, to which the outer ends of the weft-threads are attached. (See Fig. 36.) During the operation of weaving and of inserting filling into the shuttle the said supporting-plate—it in practice covering the top of the shuttle-box when the lay is in its forward position—prevents the weft-thread in the rapid motions of the loom from being caught by the picker or from becoming entangled with any moving part of the loom. That end of the lay containing the shuttle-box, in which the shuttle is confined when the filling is changed, is slotted, as at $t$, Fig. 29, not only for the picker to move therein, but the slot is enlarged at one end so as to make a shuttle-box with an open bottom, the slot being large enough to enable a bobbin or spindle pushed through from the under side of the shuttle to pass out through the shuttle-box at that end of the lay into a suitable receptacle placed in proper position to receive it. In this instance of my invention the lay at its front side near the shuttle-box is cut away or shaped, as best shown in Fig. 1 and in plan in Figs. 27 and 28, so as to leave an inclined projection D', the lay near its cut-away parts being provided with a finger $D^2$, and with a metal or other strap $D^3$ extended along the lay for a distance substantially equal to the length of the slot in which the picker-stick works, the said strap practically forming one side of the guideway in which the picker works, and being sufficiently separated from that part of the lay constituting the other side of the slot in which the picker-stick works to correctly guide the picker-stick and prevent it from wabbling. The incline D' is so located as to be struck by the head of the bobbin or spindle as the latter is ejected through the bottom of the shuttle-box, while the finger $D^2$ is so located as to be struck by the point or blade end of the bobbin as it falls, and owing to the greater weight of the head of the bobbin or spindle the latter, as the point of the bobbin is somewhat arrested by the finger, is made to go head foremost into the receptacle, the incline also diverting the head of the bobbin laterally as it falls, so that the bobbin will not be struck by the picker-stick.

When the shuttle is thrown home into the shuttle-box, it strikes the picker and is apt to rebound, and should the shuttle vary considerably as to its position longitudinally with relation to the hopper and the pusher when the shuttle is to receive filling, then the bobbin would not be properly entered into the shuttle. To overcome this difficulty I have devised a shuttle-positioning mechanism, which I will now describe, to thus place the shuttle approximately in the same position longitudinally with relation to the pusher whenever the shuttle is to be supplied with filling. To the front side of the lay, near the mouth of the receiving shuttle-box, I have attached a stand E, having suitable bearings for the reception of the shank E' of the shuttle-positioning device $E^2$, the shape of which is best shown in Figs. 2 and 4, Figs. 5, 6, and 8 showing the same enlarged. The shank of the shuttle-positioning device is acted upon by a suitable spiral or other spring, as $E^3$, which normally keeps the said positioning device in the position shown in Figs. 11 and 13 and at the right in Fig. 4. The free end of the shuttle-positioning device is provided (see Figs. 5, 6, and 8) with a recess to receive the tip of the shuttle and prevent bruising it. The shank E' has connected to it at its lower end the hub of the finger $E^4$, (shown in section in Fig. 5 and in plan view in Fig. 7,) the said finger having suitable ears between or on which is mounted, as represented, a roller $E^5$. The stand E has a depending bracket $w$, (see Fig. 25,) having a stud on which is mounted a roller $w'$.

The loom-frame has attached to its inner side under the breast-beam suitable bearings $d$ for a trip-shaft $d'$, provided with a finger $d^2$, attached thereto in suitable manner, as by a set-screw, (see Fig. 9,) the finger being so located with relation to the filling-fork $A^{21}$, its slide, and the lever $A^{25}$, that when the latter is moved by the filling-fork slide in its travel toward the front of the loom the lower end of said lever, or a projection $d^4$ thereof, acts upon the said finger $d^2$ and partially turns the said trip-shaft. This trip-shaft $d$, near the opposite or left-hand side of the loom, has attached to it by a suitable set-screw an arm $d^5$, (see Figs. 2, 3, 13, and 14,) and the said shaft near its end outside the loom-frame has attached to it a trip-finger $d^7$. The arm $d^5$ has a weight $d^{10}$ sufficiently heavy to turn and keep the shaft $d'$ in its normal or inoperative position, the said weight (see dotted lines, Fig. 3) at such time resting against an adjustable stop $d^{12}$, connected by a suitable set-screw to a part of the upright $d^{13}$, which receives the journals of the usual take-up or sand roll. (Not herein shown.)

Owing to the rapid movement of the lay and the brief space of time that the shuttle rests in the box after being thrown by the picker-stick the difficulty of inserting filling into the shuttle becomes so great that every aid in such direction is of high importance. I have utilized three important conditions: first, by making my bobbin or spindle cylindrical, so that it may roll into place; second, by inserting the said bobbin or spindle while the lay is moving forward, which forward movement materially aids in the rotation of the bobbin in a proper direction to enter the shuttle, and third, by inserting the bobbin or spindle while the lay is at the slowest period of its movement.

The bobbins $b$ (shown in Figs. 18 and 20) have their heads provided with one or more, it may be, annular rings or projections $b^7$ with adjacent spaces.

The modified form of filling or weft carrier (shown in Fig. 21$^a$) instead of being made of wood has a metal blade inserted into a cylindrical metal head, the said head having projections and grooves, as described and shown with relation to the wooden bobbins in Figs. 18 and 20.

By the term "blade" as herein employed I mean that part of the bobbin or spindle by which the weft or filling is carried, and by the term "bobbin or spindle" I mean to include as within the scope of my invention any ordinary or usual form of bobbin or spindle or weft-carrier which may be handled as described.

It will be noticed that the hopper or guide B may contain any desired number of bobbins or spindles; but herein, to save space upon the drawings, I have represented but three bobbins in the hopper.

The shuttle shown in Fig. 22 is substantially the same as that described in my application Serial No. 351,227, it having jaws marked $j$ $k$, the inner faces of which are notched or corrugated and somewhat concaved from their upper to their lower edges to receive between them and hold securely the head of the bobbin or spindle, the projections of the said head entering or engaging notches in the jaws, or vice versa, said jaws yielding to a limited extent when the head of the bobbin is pressed between them. These jaws hold the bobbin placed between them by the pusher in substantially central position in the shuttle, and when the spent bobbin in the shuttle is to be ejected therefrom it is discharged from the jaws through the side thereof and through the shuttle at the side thereof opposite that at which the bobbin entered both the holder and the shuttle.

It is not intended to limit this invention to the particular shape of the projections or spaces of either the bobbin-heads or the holders, the gist of the invention being that the holder shall so engage the bobbin as to prevent longitudinal motion thereof in the shuttle, yet permit the bobbin to be put in place between the holders at one side of the shuttle and to be discharged from between the said holders at the opposite side of the shuttle.

The shuttle referred to (shown best in Figs. 22 to 24) is slotted from a point just beyond the end of the bobbin to the usual eye in the side wall of the shuttle to thus leave a space, which may be denominated a "self-threading slot," into which the weft or filling thread from the bobbin may be laid laterally, thus avoiding inserting the end of the filling through a hole or sucking it through a hole, as in ordinary shuttles.

One very important feature of the invention herein contained is the employment in a loom of what is known as a "self-threading shuttle," so that when the bobbin is inserted automatically into the shuttle from the hopper the weft or filling thread will be automatically laid into the delivery-eye of the shuttle, ready to be delivered from the bobbin through the delivery-eye into the shed, as in ordinary weaving.

In the form of my invention herein embraced the shuttle S, having the slot 3 and cut away at 4 in communication with the said slot, has applied to it a plate S', the plate being secured to the shuttle-wood by suitable rivets or screws $b^{10}$. As represented, this plate has a point 7, which intersects or overlaps substantially the groove 3, or is so shaped as to present a horn 7, under which the filling-thread may be drawn when laid in the slot 3. This plate is also represented as having secured to it an eye 6, which constitutes the delivery-eye of the shuttle. These eyes, being open, permit the lateral introduction of the thread $w^3$ into them, and they retain the thread within them as it runs out.

It is not intended to limit this invention to the particular construction of the self-threading shuttle herein represented, and instead I may use any other suitable form of self-threading shuttle-eye.

It will be noticed that the end of the weft or filling $w^3$ from each bobbin or spindle in the hopper will be led therefrom and secured to the stud or holder $B^{19}$, as in Fig. 36, and such end of the weft or filling will be held by the said stud when the bobbin is pushed into the shuttle, and during the first crossing of the shuttle the weft or filling will be drawn automatically in the slot 3 and will get under the point 7, and the second crossing of the shuttle will cause it to follow through and into the open delivery-eye 6, to be thereafter properly delivered from the shuttle and be laid into the shed.

In operation let it be assumed that the hopper has been filled with a series of bobbins or spindles containing weft, and that the lowermost bobbin or spindle of the series is supported as represented in Fig. 11. Now so long as the loom works properly and the filling is being correctly laid in the shed the pusher $B^{14}$ remains in the position shown in the said figure, and so does the tripping device $C'$, and the trip-shaft $d'$ and its attached parts and the shuttle-positioning device $E^2$ stand as in Fig. 12. Should the weft, however, fail for any reason, either because the same is exhausted from the bobbin or becomes accidentally broken, the filling-fork, which in practice is tipped by the presence of the filling in the shed, is not tipped, and as the hammer $A^{19}$ moves it engages the lip at the end of the shank of the filling-fork and pushes the slide $A^{24}$ toward the front of the loom, turning the lever $A^{25}$ and causing it to act upon the finger $d^2$ and turn the trip-shaft $d'$, so that the bunter $d^5$ is lifted and put in such position that as the lay continues to move forward the roller $E^5$, carried by the collar $E^4$ at the lower end of the shaft $E'$, will strike against it. As this bunter is lifted by turning the shaft $d'$, the finger $d^7$ is also lifted or turned up in the direction of the arrow near it in Fig. 11, so that it acts upon the tripping device $C'$ and puts it into the position in Fig. 13, said figure showing both the bunter and the finger so lifted. Now as the lay continues its forward movement after the trip-shaft has been turned to lift the bunter and finger, as described, the roll $E^5$, by acting against the bunter $d^5$, causes the shaft $E'$ to be oscillated and the shuttle-positioning device $E^2$ to sweep across the raceway of the lay from the position Fig. 12 into the position Fig. 16, thus causing the said positioning device to act upon the inner end of the shuttle and push it back into the shuttle-box in case the shuttle should have rebounded or should be out of position longitudinally in the shuttle-box with relation to the pusher.

During the time that the lay is being moved forward, as described, after a fault in the filling and as soon as the shuttle-positioning device has acted, the projection $C^2$, carried by the lay, (see Fig. 13,) engages the upper end of the tripping device, preferably by entering the notch therein, and causes the pivot $C$ connecting the tripping device with the short arm of the pusher, to travel backwardly into the position Figs. 1 and 15, such movement of the pusher causing its acting end lying above a bobbin to travel from the position Figs. 11 and 13 into the position Figs. 1 and 15, the pusher during such movement acting upon the head of the bobbin or spindle and pushing it from the delivery end of the hopper directly into the open upper side of the shuttle and into the holder with which the shuttle is provided for the retention of the bobbin until spent or exhausted. As the pusher depresses a bobbin under it, the rest $B^{10}$ turns about its pivotal point or stud $B^7$ by the pressure of the bobbin upon it, the rest, however, assuming its normal position quickly through the spring $b^2$ as soon as the bobbin passes below it on its way into the shuttle. While the pusher acts to place the endmost bobbin or spindle in the hopper in the shuttle in the shuttle-box, it also acts as a stop (see Fig. 15) for the bobbin next back of the one then being removed from the hopper. The bobbin pushed from the hopper strikes against the bobbin then in the shuttle in the shuttle-box and held by the holder within the shuttle and pushes the spent bobbin out from the holder and through the under side of the shuttle, and through the open bottom of the shuttle-box out through the discharge-passage in the lay and into a suitable receptacle. As the spent bobbin is pushed from the shuttle by the incoming bobbin, as described, it passes through the open bottom or front of the shuttle-box, the opening being formed by enlarging at one end the usual slot in which the picker-stick moves. On its way through the bottom of the shuttle-box the head of the bobbin strikes the incline $D'$, while the blade of the bobbin strikes the finger $D^2$, the said incline and finger preventing the picker-stick, which moves in a slot behind the strap $D^3$, from striking the spent bobbin. As described, the pusher acts to push the bobbin from the hopper into the shuttle during the forward movement of the lay or toward the breast-beam, at which time the lay is moving, or is supposed to be moving, at substantially its slowest speed, which reduces the momentum of the rapidly-moving parts. In practice the lay on its back-stroke commences to move slowly and increases its speed, whereas on its forward stroke it starts fast and decreases its speed until the reed meets the filling to beat it into the fell. After the bobbin has been pushed from the hopper into the shuttle and the spent bobbin previously in the shuttle has been pushed out through the open lower side of the shuttle by the incoming bobbin the lay commences to move backwardly, and in going back the spring $B^{15}$ by its action upon the pusher keeps the notched or upper end of the tripping device in engagement with the projection $C^2$, carried by the lay, until the pusher arrives into substantially its normal position, by which time the said projection leaves the tripping device, so that it may be turned by the spring $C^5$ into its normal position. As soon as the projection $C^2$, carried by the lay, strikes the tripping device to actuate the pusher, as described, the lower end of the tripping device is moved away from the finger $d^7$, and the finger thereafter remains in its elevated position until in the backward movement of the lay the bunter $d^5$ has been drawn away from and retires from the roll $E^5$ at the lower end of the shuttle-positioning device, at which time the weighted part $d^{10}$, attached to the shaft $d'$, acts to turn the said shaft and let the said bunter and the finger $d^7$ drop into their normal positions, where they will remain until the said rock-shaft $d'$ is again moved or turned in the opposite direction by or through the filling-fork or the filling stop-motion device used.

It will be understood that in my claims, when using the term "bobbin," I mean to include all kinds of bobbins, spindles, tubes, and other device or carrier upon which filling-yarn may be spun or held, and off from which the filling is unwound during the movement of the shuttle.

I have described the loom herein shown as having a co-operating shuttle-positioning device; but it will be understood that a loom containing either of the devices herein claimed and not having a shuttle-positioning device would be within the scope of my invention.

The bobbin and shuttle shown in Figs. 18, 20, and 22 is made the subject of claim in application Serial No. 351,227, filed May 10, 1890; a form of split spindle having its head held in a holder carried by a self-threading shuttle is made the subject of claim in an application Serial No. 352,960, filed by me May 15, 1890, and the particular form of spindle shown in Fig. 21$^a$ of this application, Serial No. 380,494, forms the subject of application Serial No. 386,045, filed by me.

I claim—

1. A loom containing the following instrumentalities, viz: a hopper to guide a bobbin, a lay having a shuttle-box, a shuttle therein having holding devices to receive and hold a bobbin, and a pusher to push a bobbin from the hopper into position in the shuttle, substantially as described.

2. A loom containing the following instrumentalities, viz: a lay, a shuttle-box, a bobbin or device carrying filling, a stud or holder for the end of the filling contained upon the said bobbin or device, and a shuttle having a self-threading or slotted eye, whereby the said eye may be automatically threaded as the shuttle is being thrown, substantially as described.

3. The hopper shaped to receive and guide the head of a bobbin, combined with a yielding stop located at the lower end of the hopper and adapted to support the bobbin.

4. A loom containing the following instrumentalities, viz: a hopper to contain a bobbin, a lay having a shuttle-box, a shuttle therein, a shuttle-positioning device, and a pusher to push a bobbin from the hopper into the shuttle, substantially as described.

5. A loom containing the following instrumentalities, viz: a lay having a shuttle-box, a shuttle therein having holding devices to receive and hold a bobbin, a hopper to contain a bobbin, a pusher to push a bobbin from the hopper into position in the shuttle, and a positioning device to keep the shuttle in proper position to receive the bobbin, substantially as described.

6. The weft-feeler, the lay, its shuttle-box, and a shuttle-positioning device, combined with devices between the said feeler and the said shuttle-positioning device to actuate the latter when the weft fails to put the shuttle into proper position in the shuttle-box, substantially as described.

7. The lay, its shuttle-box, and the shuttle-positioning device, combined with means to move the said device and hold it in position during a part of the movement of the lay, substantially as described.

8. A hopper to receive and guide bobbins, and a lay and shuttle-box, combined with a shelf or guard to prevent the ends of the weft-threads in the hopper from being entangled with moving parts of the loom, substantially as described.

9. A loom having the following instrumentalities, viz: a lay having a shuttle-box, a shuttle having a slotted delivery-eye, a hopper to contain a bobbin, a pusher to push a bobbin from the hopper into position in the shuttle, a catch or stud to hold the outer end of the weft-yarn, the said yarn being automatically threaded into the said delivery-eye during the movement of the loom, and a guard to prevent the ends of weft caught by the said catch or stud from being entangled by the moving parts of the loom, substantially as described.

10. In a loom, the following instrumentalities, viz: a shuttle, a bobbin-holding hopper, a device actuated upon the failure of the weft-thread to deliver a bobbin from the hopper into position in the shuttle, and a device for positioning the shuttle with reference to the hopper to insure the correct reception of the bobbin into the shuttle, substantially as described.

11. A loom containing the following instrumentalities, viz: a lay having a shuttle-box, a shuttle in the said shuttle-box, a hopper or guide containing filling, a pusher to push the filling from the hopper into the shuttle, a trip connected to the pusher, a bunter on the lay to hit the trip, a weft-feeler, and devices actuated thereby to move the said trip into position for coaction with the bunter when the pusher is to be actuated, substantially as described.

12. In a loom, the following instrumentalities, viz: a shuttle-box open for the discharge of a bobbin, a shuttle therein open at two of its sides for the reception and discharge, respectively, of a bobbin, and a pusher to push a bobbin into the said shuttle against a bobbin already therein and eject the bobbin already in the shuttle through the shuttle and the slot in the shuttle-box, substantially as described.

13. The lay having at one end a shuttle-box slotted at its bottom and provided with a cam projection below the bottom of the shuttle-box, against which the head of the bobbin being ejected strikes and is thereby deflected laterally, substantially as described.

14. The lay having at one end a shuttle-box slotted at its bottom and cut away below the bottom of the shuttle-box, and provided with a finger, against which the tip of the ejected bobbin strikes, substantially as described.

15. In a loom, the following instrumentalities, viz: a hopper or guide for a bobbin, a bobbin having a substantially circular head, a lay having a shuttle-box open for the discharge of a bobbin, a shuttle therein open for the passage of the bobbin into one side and its exit from the other side, and a pusher to act on the bobbin and push it into the shuttle, substantially as described.

16. A loom having the following instrumentalities, viz: a lay having a shuttle-box open at its lower side, a shuttle having a holder for a bobbin and open at its opposite sides for the entrance of the bobbin into the shuttle at one side and its discharge from the opposite side, and a pusher to push the bobbin into the shuttle, substantially as described.

17. The lay and shuttle-box and a picker against which one end of the shuttle is thrown when entering the box, combined with a shuttle-positioning device recessed to fit the tip of the shuttle and adapted to act upon the other end of the shuttle, substantially as described.

18. A stationary hopper to contain a bobbin, a lay having a shuttle-box, and a pusher to push the bobbin from the hopper into a shuttle in said shuttle-box while the lay is in motion, substantially as described.

19. A hopper to contain a bobbin, a lay having a shuttle-box carrying a shuttle, and a pusher to push a bobbin from the said hopper into the said shuttle while the lay is on its forward stroke.

20. A lay, its shuttle-box, and a self-threading shuttle, combined with a pusher to push a bobbin into the said shuttle, substantially as described.

21. In a loom, the following instrumentalities, viz: a lay having a shuttle-box, a shuttle therein having two open sides, one for the entrance and the other for the exit of a bobbin, a hopper to contain a bobbin, and a pusher to act on a bobbin in the hopper, push it into the shuttle, and at the same time eject from the shuttle the bobbin previously contained by it, substantially as described.

22. In a loom, the following instrumentalities, viz: a weft-feeler, a lay, its shuttle-box, a hopper, a pusher, and connecting devices between the feeler and pusher to actuate the pusher and push a bobbin from the hopper into the shuttle, substantially as described.

23. A loom containing the following instrumentalities, viz: a lay provided with a shuttle-box open at its lower side, a bunter moving with the lay toward and from the breast-beam, a shuttle co-operating with the said shuttle-box, a hopper or guide containing filling, and a pusher having mounted upon it a trip which is adapted to be put into position in the path of the bunter when the weft fails, to thereby effect the movement of the pusher to put filling into the shuttle, substantially as described.

24. In a loom, the following instrumentalities, viz: a shuttle, a bobbin-holding hopper, and a device actuated upon the failure of the weft-thread to deliver a bobbin from the hopper into position in the shuttle, substantially as described.

25. In a loom, the following instrumentalities, viz: a hopper shaped to receive the heads of and guide bobbins, a lay having a shuttle-box, a shuttle open at one side for the reception and at another side for the discharge of a bobbin and having a holder therein at one end to receive between its jaws the head of a bobbin, the heads of the bobbins and the interior of the jaws of the holder having projections and spaces to engage one with the other to retain the bobbin in proper position in the shuttle, and a pusher to push a bobbin from the hopper into the said shuttle, substantially as described.

26. In a loom, the following instrumentalities, viz: a hopper constructed to receive and guide the heads of bobbins, a co-operating stop to arrest the lowermost bobbin and leave its upper side exposed, a lay having a shuttle-box, a shuttle open at two sides, as described, and having within it at one end a pair of jaws to receive and hold between them the head of the bobbin, and a pusher to act directly upon the said exposed bobbin and transfer it from the hopper into position between the said jaws in the shuttle, substantially as described.

27. A loom containing the following instrumentalities, viz: a lay having a shuttle-box, a shuttle therein having a holding device to receive and hold a bobbin or filling carrier off from which the filling is unwound during the movement of the shuttle, and a pusher to push the said bobbin or filling carrier supported outside the shuttle into position in the said shuttle, substantially as described.

In testimony whereof I have signed my name to this specification in the presence of two subscribing witnesses.

JAMES H. NORTHROP.

Witnesses:
GEORGE OTIS DRAPER,
WILLIAM F. DRAPER.